Figure 4:
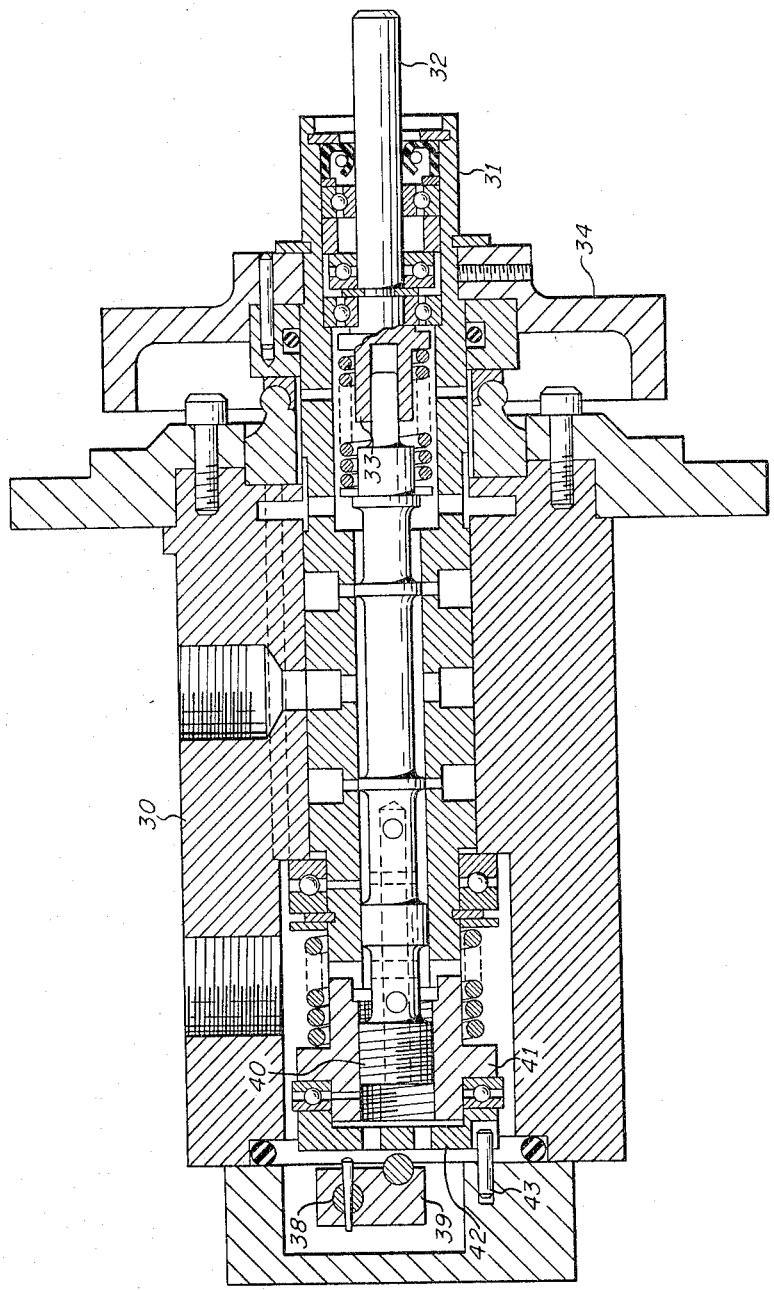

Oct. 11, 1966    R. WALTERS    3,277,790
HYDRAULIC APPARATUS
Filed July 2, 1964    3 Sheets-Sheet 1
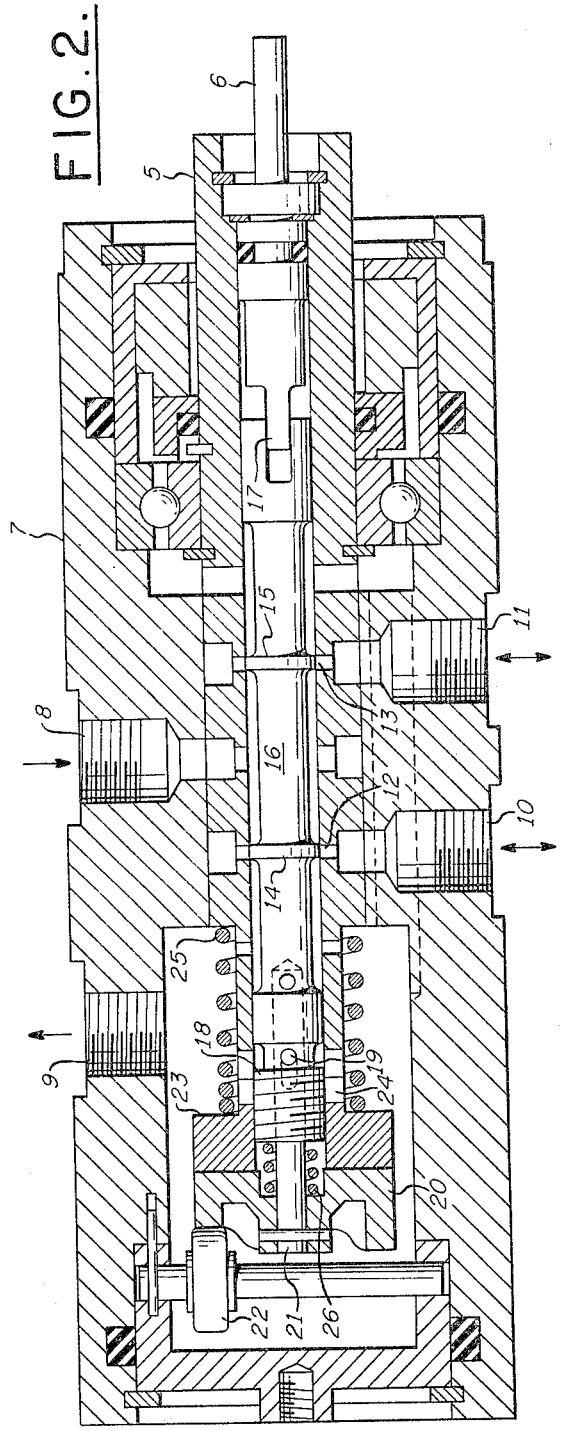
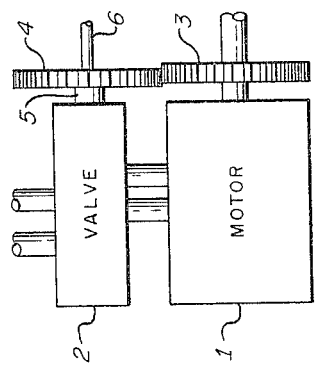
INVENTOR.
RONALD WALTERS
BY
*S.C.Yeaton*
ATTORNEY

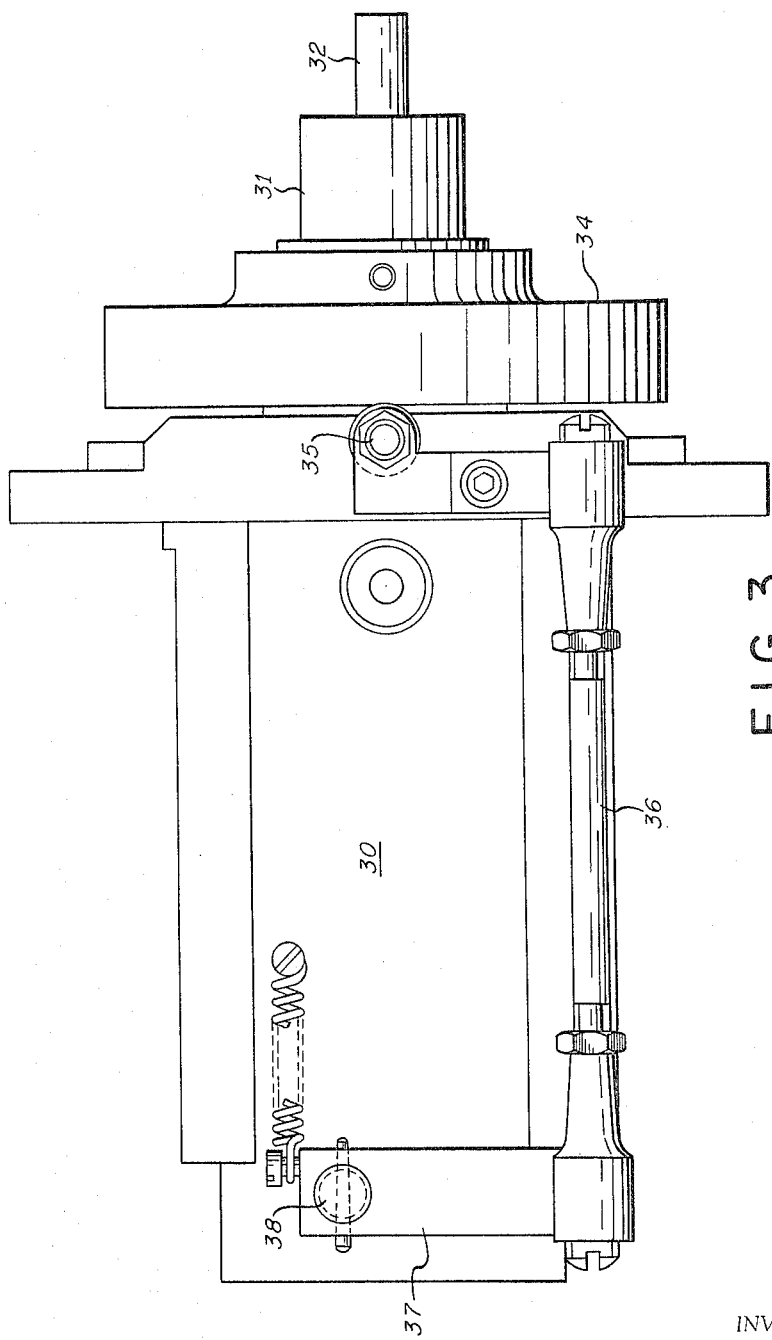

INVENTOR.
RONALD WALTERS

United States Patent Office 3,277,790
Patented Oct. 11, 1966

3,277,790
HYDRAULIC APPARATUS
Ronald Walters, Wembley, Middlesex, England, assignor to The Sperry Gyroscope Company Limited, Brentford, England, a company of Great Britain
Filed July 2, 1964, Ser. No. 379,964
Claims priority, application Great Britain, July 5, 1963, 26,703/63
7 Claims. (Cl. 91—35)

The invention relates to hydraulic apparatus.

It is an object of the present invention to provide a servo-mechanism incorporating a reversible hydraulic motor whose operation is controlled by a valve and which is suitable for, among other purposes, the provision of a non-uniform drive to the detaching rollers of a textile combing machine. It is a further object of the invention to provide a valve suitable for use in such a servomechanism.

In a textile combing machine the detaching rollers require to be driven in a non-uniform manner which may be regarded as a sum of a uniform rotation and a cyclic oscillation. Such a drive requires to be controlled so that the advance during each cycle of oscillation is accurately repeatable, and hitherto has been generated by a combination of electric motors with cams and cam followers, the movements of the cam followers being combined with continuous rotational movement by means of differential gears.

Since the power required for such a drive is substantial, being, for example, about 5 H.P., the cams and differential gears were of considerable size and weight, and one object of the present invention is to provide a more compact drive for a textile combing machine.

The invention makes use of a hydraulic control valve which controls the supply of power to a hydraulic motor in response to the sum of a pair of input signals. In the application to a textile combing machine, one input signal represents a continuous rotation, and the other represents the required oscillatory movement. Such a valve, however, being capable of producing an output movement in response to the sum of two input movements has applications other than textile combing machines.

According to one aspect of the invention a hydraulic spool valve includes a valve spool coupled to one of a pair of threaded members working one within the other, for example to a threaded stud working within a nut, and means is provided for applying axial movement to the other threaded member, and for rotating each of the two threaded members, so that the movement of the spool is the algebraic sum of the axial displacements produced by the three movements.

Valve ports may be formed in a rotatable sleeve coupled to the other threaded member for rotation by means of a coupling which will permit relative axial movement.

In the application of this valve to a servomechanism the valve is connected to control the supply of hydraulic fluid to a reversible hydraulic motor, the output shaft of the motor being coupled to cause rotation either of the nut or of the stud, and the other of these two members being rotated to provide one input to the mechanism. The second input is arranged to produce relative axial movement either of the sleeve with respect to the nut, or of the stud with respect to the spool.

For the purposes of explaining the normal operation of this arrangement let it be supposed that the motor is linked by gearing to rotate the nut through the sleeve, and that relative axial movement of the sleeve and nut is produced by an electric torque motor. If the stud is rotated by the spool, it is screwed into the nut, and if there is no axial displacement produced by the torque motor the spool will move in the sleeve and uncover the ports, supplying fluid to drive the motor. The motor is then set into operation and rotates the sleeve through the gearing, turning the nut until the spool and sleeve return to their neutral position, so closing the ports and shutting off the flow to the motor. Rotation of the input shaft in the opposite sense causes the motor to turn in the opposite direction, again until the flow is shut off by the valve returning to its neutral position.

If an electrical input is also applied to the torque motor, this causes an axial displacement of the spool in relation to the sleeve, which is added to that due to the working of the screwed stud in the nut, and the motor rotates by an amount which depends additively on the two inputs.

An arrangement of this kind could be used, for example, for displacing a control surface of an aircraft, the rotation of the shaft being produced in response to the pilot's movement of the controls or to a signal from the autopilot, while the axial displacement could represent signals from an auto-stabilizer, or trim signals.

In one form of the invention the axial displacement signal may be derived from the rotary input signal, for example by means of a cam coupled to the rotating member. This arrangement is of value in cases in which it is required to produce a non-uniform rotation of an output shaft from a uniform rotation of an input shaft.

A mechanism for driving the detaching rollers of a textile combing machine may comprise a reversible hydraulic motor and a valve arranged to control the supply of power to the motor for forward or reverse rotation in response to the sum of the first input signal representing a continuous rotation, a second input signal representing a repeated cyclic oscillation, and a feedback signal representing the motion of the detaching rollers. The valve may be of the kind described above.

The invention will be further described by way of example with reference to the accompanying drawings, in which FIG. 1 shows schematically the arrangement of valve and motor in a servomechanism of the kind described, FIG. 2 is an axial section through one form of the valve, and FIGS. 3 and 4 are an elevation and an axial section through an alternative form of the valve suitable for use in the mechanism of FIG. 1.

Referring first to FIG. 1 the drive is obtained from a servo system comprising a reversible hydraulic motor 1 controlled by a valve 2, the output shaft of the motor 1 being coupled by gears 3, 4 to a sleeve member 5 of the valve 2 and the valve being also provided with an input shaft 6 for producing rotation of the valve spool within the sleeve 5.

In operation a continuous rotation of the input shaft 6 causes the valve 2 to control the supply of hydraulic fluid to the motor 1 in such a way that the output shaft of the motor executes a rotation which is proportional to the rotation of the shaft 6 together with a sinusoidal component generated by a cam within the valve 2 as will now be described with reference to FIG. 2.

Referring now to FIG. 2 the valve 2 comprises a valve body casting 7 in which are an inlet way 8 for a supply of hydraulic fluid under pressure and outlet 9 for exhausting used hydraulic fluid to the tank, and connections 10, 11 for the reversible motor.

The sleeve 5 is free to rotate within the bore of the valve body 7 and is provided with ports 12 and 13 which cooperate respectively with lands 14, 15 on the valve spool 16 to control the supply of hydraulic fluid to the motor. The valve spool 16 is coupled to the input shaft 6 by a tongue-and-slot mechanism 17 so that the spool can move axially without axial movement of the shaft 6.

The end of the spool 16 further from the tongue-and-slot mechanism 17 carries a screwed stud 18, and a pin 19 and this drives a cam 20 through a slotted shaft 21. The cam 20 can therefore ride against a ball race 22 without axial movement of the spool.

A nut 23 engages the screwed stud 18 and is coupled so as to rotate with the sleeve 5 by means of a further tongue-and-slot mechanism 24. A spring 25 urges the nut 23 against the rear of the cam 20 and a further spring 26 between the cam 20 and the stud 18 takes up any slack between the screw threads on the stud 18 and the nut 23.

In normal operation the input shaft 6 is rotated continuously at a uniform speed. This causes the stud 18 to be screwed along the nut 23, and also rotates the cam 20. The combined effect of these motions shifts the spool 16 axially and allows hydraulic fluid to be admitted to the motor. The motor then rotates, turning the sleeve 5 and rotating the nut 23 in such a sense as to cause the valve spool to be restored to its neutral position relative to the ports in the sleeve 5. The motor therefore executes a movement proportional to the sum of the axial movement due to the cam 20 riding on the bearing 22 and that due to the screwing of the stud 18 into or out of the nut 23. The motor is therefore caused to produce a rotation of the sleeve 5 which is the sum of the uniform rotation of the input shaft 6 and an oscillatory component dictated by the shaping of the surface of the cam 20.

In one application of apparatus as just described to a textile combing machine the input shaft 6 was designed to rotate at 83⅓ revolutions per minute, the gear wheels 3 and 4 were respectively of 116 and 128 teeth, the thread between the stud 18 and the nut 23 had a pitch of 0.05″, and the cam 20 had three complete cycles at its periphery with an overall lift of one-eighth of an inch. The valve and motor were designed to operate from a hydraulic pump giving a pressure of 3,000 lb. to the square inch, and the mean power output of the motor was 5 H.P.

An alternative design of valve is shown in FIGS. 3 and 4.

In the form of valve shown in these figures the arrangement is generally similar to that shown in FIG. 2, but the cam and cam follower are arranged externally at the drive end of the valve for convenience in adjustment and replacement. The valve consists of a valve body 30 containing a sleeve and spool arrangement generally similar to that described with reference to FIG. 2, and from one end of which protrude the rotatable ends of a sleeve 31 and a member 32 coupled to the valve spool for rotation. This coupling is a tongue-and-slot coupling 33 shown in FIG. 4.

On the sleeve 31 there is mounted a crown-type cam 34 against the cam face on which bears a cam follower 35. Movement of these is transmitted through a link arm 36 to a lever 37 which, by means of a shaft 38, operates a crank 39 (FIG. 4) within the valve to produce the required axial movement of the nut.

The sleeve and spool of the valve are similar in their arrangement to those described above with reference to FIG. 2, which description will not be repeated here, but the stud 40, which is coupled to the spool works within a nut 41 coupled by a tongue-and-slot mechanism to the sleeve and this nut bears through a roller thrust bearing against an end member 42. The end member is connected by a bearing at the end of the crank 39 and is secured against rotation by a pin 43.

In operation of this form of the valve uniform rotational motion is communicated to the sleeve 31 and thereby to the cam 34 and also to the nut 41. As the cam rotates, rocking movement its transferred through the link 36, lever 37, shaft 38 and crank 39 to the end member 42 and therefore also via the nut 41 to the valve spool. The motor is coupled to the shaft 32 and thereby causes rotation of the spool and also of the stud 40, so as to restore the valve spool towards the neutral position and to cause the motor to execute a movement which is the sum of that dictated by the uniform rotation applied to the sleeve 31 and the oscillation generated by the face of the cam 34.

What I claim is:

1. A hydraulic spool valve comprising a valve spool coupled to one of a pair of threaded members working one within the other, and means for applying axial movement to the one of said threaded members and for rotating each of the two threaded members, whereby the movement of the valve spool is the algebraic sum of the axial displacements produced by the three movements.

2. A hydraulic valve according to claim 1 in which the threaded members comprise a threaded stud coupled to the valve spool and arranged to work within a nut.

3. A hydraulic valve according to claim 2 in which valve ports are formed in a rotatable sleeve coupled for rotation to the nut by the coupling which permits axial movement.

4. A hydraulic valve according to claim 1 including means for deriving a repeated cyclic axial movement of the one threaded member from its rotation.

5. In a textile combing machine means for driving the detaching rollers comprising a reversible hydraulic motor and a valve arranged to control the supply of power to the motor for forward or reverse rotation in response to the sum of a first input signal representing a continuous rotation, a second input signal representing a repeated cyclic oscillation, and a feedback signal representing the motion of the detaching rollers.

6. The hydraulic valve according to claim 4 wherein said deriving means comprises cam and cam follower means coupled between a fixed part of said valve and said one threaded member.

7. A hydraulic valve for controlling the supply of hydraulic fluid to a reversible hydraulic motor comprising,
  (a) a housing having a bore with inlet and outlet fluid ports communicating therewith,
  (b) a sleeve rotatably mounted in said bore and having valve ports therein communicating with the inlet and outlet ports of said housing,
  (c) a valve spool mounted for rotary and axial movement within said sleeve and having land portions cooperable with said valve ports for controlling the flow of fluid through said valve upon axial movement of said spool relative to said sleeve,
  (d) a pair of threaded members working one within the other, one of said members being coupled with said spool and the other being coupled with said sleeve, and
  (e) means coupled with said spool and sleeve for producing axial movement of said spool and rotary movement between said threaded members,
    whereby the flow of fluid through said valve produced by the resultant axial movement of said spool is proportional to the algebraic sum of the axial displacements produced by said movements.

References Cited by the Examiner

UNITED STATES PATENTS

| | | | |
|---|---|---|---|
| 1,908,144 | 5/1933 | Gros | 91—367 X |
| 2,540,381 | 2/1951 | Schurr | 91—367 |
| 2,681,116 | 6/1954 | Treseder | 91—429 X |
| 2,839,031 | 6/1958 | Gregory | 91—367 X |
| 3,024,769 | 3/1962 | Scheurich | 91—367 X |
| 3,103,148 | 9/1963 | LeBrusque | 91—367 X |

MARTIN P. SCHWADRON, *Primary Examiner.*

SAMUEL LEVINE, *Examiner.*

A. S. ROSEN, *Assistant Examiner.*